Jan. 21, 1969 D. D. POLIZZI 3,422,847
CYCLIC CONTROL FOR MULTIPLE VALVES
Filed Jan. 16, 1967
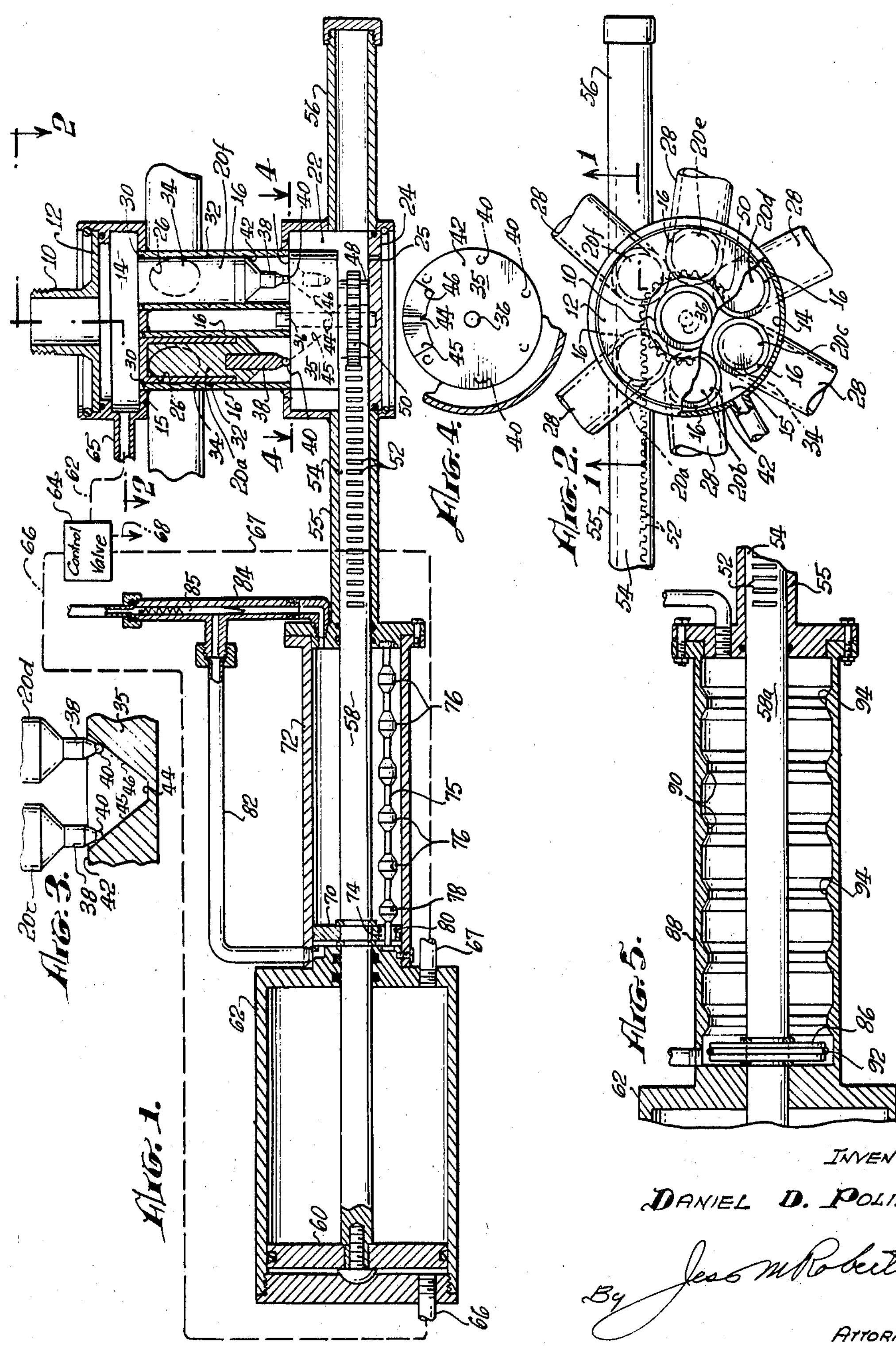
INVENTOR.
DANIEL D. POLIZZI,
By [signature]
ATTORNEY.

United States Patent Office 3,422,847

Patented Jan. 21, 1969

3,422,847

CYCLIC CONTROL FOR MULTIPLE VALVES

Daniel D. Polizzi, 630 W. 8th St., Upland, Calif. 91786

Filed Jan. 16, 1967, Ser. No. 609,506
U.S. Cl. 137—624.18 14 Claims
Int. Cl. F16k 11/10, 31/12

ABSTRACT OF THE DISCLOSURE

The specific embodiment of the invention disclosed herein is operable through an automatic cycle to open a series of valves in sequence for predetermined periods of time to distribute water from a pressurized supply to a corresponding series of supply pipes in a sprinkler system. A hydraulic power cylinder actuated by the pressurized water supply operates a cyclic control in the form of a cam, the series of valves being biased against the cam by the water pressure. A dashpot arrangement retards the hydraulic motor intermittently to cause the cam to be retarded at spaced points in its operation to keep the successive valves open for the predetermined periods of time.

*Background of the invention*

The invention pertains broadly to devices wherein a cyclic control atomatically carries out a predetermined program for operating a series of means in sequence. The disclosed embodiment of the invention is an automatic cycle control to operate different parts of a sprinkler system in sequence and has special utility for a homeowner who desires to automate the task of watering the grounds around his home.

One type of prior art automatic sprinkling system is electrically or electronically controlled and is not only unduly expensive for a homeowner but is also complicated and subect to various kinds of failure that can be corrected only by highly skilled technicians.

Another type of prior art automatic control comprises a motor driven mechanical arrangement which, from the viewpoint of the average homeowner, costs too much and in addition cannot be relied upon for a reasonably long trouble-free service life.

A third type of automatic control is a mechanism actuated by the pressurized water supply. Such mechanisms include various hydraulic timer means which may incorporate bleeder orifices and/or float controls. Automatic systems of this third type may be fabricated economically but a serious inherent disadvantage of such a control is that malfunctions are readily caused by corrosion and by cumulative deposits of precipitates from the water.

The problem to which the present invention is directed is to provide a relatively inexpensive but efficient automatic control for a sprinkler system, which automatic control is actuated by the pressurized water supply with minimum possibility of failure by reason of either corrosion or deposits precipitated from the water.

*Summary of the invention*

Broadly described, the preferred embodiment of the invention comprises the combination of: a plurality of valves; a cyclic control operable to open the valves in sequence for predetermined periods of time; a hydraulic power cylinder actuated by the water supply to operate the cyclic control; and a dashpot to retard the operation of the power cylinder intermittently to result in the predetermined time periods of water flow. Within this broad concept the invention teaches a number of features which work together for reliability and a long service life without requiring any special attention on the part of the homeowner.

One feature of the invention is in the use of a hydraulic power cylinder with a reciprocative piston therein that is operatively connected to the cyclic control. Such a hydraulic cylinder in which the piston normally moves from one limit position to another position every twenty-four hours is self-cleaning and is reliable over a long period of time. Any servicing that may be needed in the course of time is relatively simple and requires no specialized skill.

Another feature is that the cyclic control comprises essentially a cam and the individual valves of the series of valves are unbalanced to be biased against the cam by the pressure of the water supply. This arrangement is especially simple and reliable in that it eliminates the need for any valve springs whatsoever. The problem of avoiding faulty valve operation arising from corrosion and accumulated deposits as well as arising from deterioration of washers is solved by using piston type valve members with long lasting O-rings and by using low friction valve sleeves such as nylon sleeves or Teflon sleeves in the valve arrangement. Preferably each of the piston-shaped valve members is encased in such a sleeve. The piston-type valve members isolate the water from the cyclic control cam to result in a long service life on the part of the cam.

A further important feature of the invention that is conducive to trouble-free operation is that the dashpot mechanism is isolated from the water supply and employs a dashpot fluid other than water such as a suitable grade of oil. Such a dashpot is inherently capable of reliable operation for an indefinite period of time.

The various features and advantages of the invention may be understood from the following detailed description and the accompanying drawing.

*Brief description of the drawing*

In the drawing, which is to be regarded as merely illustrative:

FIG. 1 is a longitudinal sectional view of the presently preferred embodiment of the invention with part of the control system shown diagrammatically;

FIG. 2 is a transverse section along the angular line 2—2 of FIG. 1 showing the arrangement of the multiple valves;

FIG. 3 is a fragmentary diagrammatic view showing how the control cam is related to two of the valves at an intermediate point in the cycle of operation;

FIG. 4 is a view partly in section and partly in plan showing the rotary cam as seen along the line 4—4 of FIG. 1; and FIG. 5 is a fragmentary sectional view showing an alternate form of dashpot.

*Description of the preferred embodiment*

FIG. 1 shows a nipple 10 for connection to a pressurized water supply, which nipple is integral with a removable wall 12 of an inlet chamber 14. The inner wall 15 of the inlet chamber 14 has a series of six circular openings in which are mounted the upper ends of six tubular valve bodies 16 in which are slidingly mounted six corresponding piston-type valve members 20$a$–20$f$. As may be seen in FIG. 2 the six tubular valve bodies 16 are crowded together in a circular series with a substantial gap between the two tubular valve bodies at the two opposite ends of the series, i.e., between the tubular valve bodies that house the two endmost valve members 20$a$ and 20$f$. The lower ends of the six tubular valve bodies 16 open into a control chamber 22 having a removable bottom wall 24 with a drain port 25 therein.

The six tubular valve bodies 16 have radial outlet ports 26 near their upper ends which communicate with six corresponding radial pipes 28 for connection to various header pipes of a sprinkler system. Each of the tubular valve bodies 16 is provided with two fixed O-rings embracing the corresponding valve member 20, one O-ring 30 being above the corresponding outlet port 26 and the other O-ring 32 being below the outlet port. In the construction shown, each of the piston-type valve members 20 is provided with a cylindrical jacket 34 of a low friction plastic material such as nylon or Teflon for sliding contact with the two O-rings, each jacket extending over the end of the tubular valve member as shown.

In this particular embodiment of the invention a rotary cam 35 is mounted on an upright axle 36 in the control chamber 22 and each of the piston-type valve members 20 has an axial stem 38 which tapers at its lower end and journals a rotary ball 40 to serve as a follower in cooperation with the cam. This rotary cam 35 has a circumferential rim 42 which functions as an upper dwell, the rim having a single recess of V-shaped configuration providing a short lower dwell 44 flanked by two sloping shoulders 45 and 46.

At the starting or idle position of the rotary cam 35 the stems 38 of the two endmost valve members 20$a$ and 20$f$ straddle the V-shaped recess of the cam with both of the stems on the upper dwell of the cam as shown in FIG. 1. At intermediate positions of the rotary cam in the course of the operating cycle the spacing between the stem 38 of two successive valve members 20 is less than the width of the V-shaped cam recess. Thus, as indicated diagrammatically in FIG. 3, at intermediate rotary positions of the cam 35 two of the successive valve stems 38 may be on the opposite slopes 45 and 46 of the V-shaped recess instead of being on the upper dwell.

It is apparent that rotation of the cam 35 opens the six valves in sequence with the opening stages overlapping. Thus in FIG. 3 a valve that is being opened is in a partially open position and at the same time an adjacent valve that is being closed is also in a partially open position. It will be noted in FIG. 3 that the pressure of the two valves against the two slopes of the V-shaped recess tends to rotate the cam in opposite directions. Thus, in effect, the valve that is being opened assists the cam in closing the other valve.

Within the scope of the invention, various expedients may be employed to utilize the energy of the pressurized water supply to rotate the cam 35 to carry out the automatic cycle. In the construction shown, the rotary cam 35 is provided with a hub 48 that is formed with peripheral gear teeth 50 to mesh with the teeth 52 of a rack bar 54. The rack bar 54 reciprocates in a tube 55 that is tangential to the cam hub 48, the leading end of the rack bar extending into a second tangential tube 56 that is closed at its outer end.

The rack bar 54 is a continuation or extension of a piston rod 58 that carries a piston 60 in a hydraulic power cylinder 62. The power cylinder 62 is controlled by a manually operable four-way valve 64 of a well known construction that is connected by a tube 62 to the previously mentioned inlet chamber 14 to place the pressurized water supply in communication with the power cylinder. Another tube 66 extends from the control valve 64 to one end of the power cylinder 62; a second tube 67 extends from the control valve to the other end of the power cylinder and a third tube 68 for return flow from the power cylinder may either be connected to a sewer or may extend to a nearby ground area that requires daily watering.

Within the broad scope of the invention any suitable means may be provided to retard the movement of the piston 60 intermittently to cause each of the successive valves to remain open for a predetermined period of time while the follower of the valve traverses the short lower dwell 44 of the V-shaped recess in the rotary cam 35. In the preferred embodiment of the invention illustrated by FIG. 1, a dashpot for this purpose includes a dashpot piston 70 that is mounted on the piston rod 58 to reciprocate in a dashpot cylinder 72 thot contains a suitable hydraulic fluid such as oil. The dashpot piston 70 is formed with an aperture 74 to traverse a fixed longitudinal rod 75 that has six spaced enlargements 76 corresponding to the six valves. Each enlargement has a cylindrical surface 78 of an axial dimension that corresponds to the dimension of the inner dwell 44 formed by the V-shaped recess in the rotary cam. The aperture 74 of the dashpot pison 70 may be provided with an inner circumferential O-ring 80 for sealing contact with each of the successive cylindrical surfaces 78 of the enlargement 76.

The dashpot arrangement includes a suitable bypass to permit the dashpot fluid to flow from one side of the piston 70 to the other side when flow through the dashpot piston is prevented by one of the enlargements 76 of the longitudinal rod 75. In the construction shown the dashpot interconnects the opposite ends of the dashpot cylinder 72 and includes a bypass tube 82 and a needle valve 84 having a manually adjustable valve member 85.

At the starting or normal idle position of the parts of the mechanism shown in FIG. 1, the piston 60 is at one end of the power cylinder 62, the dashpot piston 70 is at the corresponding end of the dashpot cylinder 72 and the cam 35 is positioned with the operating stems 38 of the two piston type valve members 20$a$ and 20$f$ straddling the V-shaped recess of the cam. At this time the pressurized water supply may be in communication with either end of the power cylinder 62 to maintain the piston 60 at one of its limit positions. FIG. 1 shows the piston 60 at its leftward position.

Manually operating the control valve 64 to reverse the pressure connection with the power cylinder 62 for the purpose of initiating an automatic cycle of operation forces the piston 60 to move rightward and initially the piston moves rapidly until the aperture 74 in the dashpot piston 70 encounters the first enlargement 76 on the longitudinal rod 75 to cut off flow through the dashpot piston. The rack bar 54 that rotates the cam 35 then moves slowly, the rate of movement being determined by the adjustment of the valve member 85 of the needle valve 84 in the dashpot bypass.

Thus the cam 35 initially rotates rapidly to bring the follower ball 40 of the first piston-type valve member 20$a$ to the beginning of the lower dwell 44 of the cam and then the cam turns at a retarded rate to keep the follower 40 on the lower dwell 44 for the desired predetermined time interval. At the end of the predetermined time interval the first enlargement 76 of the longitudinal rod 75 clears the O-ring 80 of the aperture 74 in the dashpot piston 70 with the consequence that the cam 35 rotates rapidly to bring the axial stem 38 of the next piston-type valve member 20$b$ to the beginning of the lower dwell 44 where the second enlargement on the rod 75 takes effect.

In this manner the cam 35 makes one revolution to carry out a complete operating cycle in which each of the valves is opened in succession with slight overlap in the open stages of the successive valves. When the dashpot piston 70 clears the endmost enlargement 76 at the right end of the rod 75, the piston 60 moves rapidly to its right limit position at which the two axial stems 38 of the two piston-like valve members 20$a$ and 20$f$ again straddle the V-shaped recess of the cam 35.

Twenty-four hours later the control valve 64 may be manually returned to its original adjustment to cause return of the piston 60 from the right hand end of the power cylinder 62 to the left hand end thereby to rotate the cam 35 through one complete revolution in the opposite direction to repeat the operating cycle.

It is to be noted that the system is adapted for remote control since the control valve 64 may be located at any desired distance from the rest of the mechanism. For such remote control it is necessary merely to provide tubes 62, 66 and 67 of the required lengths.

FIG. 5 shows an alternate form of dashpot in which a dashpot piston 86 on piston rod 58*a* reciprocates in a dashpot cylinder 88 that is formed with spaced inner circumferential lands 90 for cooperation with an O-ring 92 of the piston. Each of the inner circumferential lands 90 has an inner circumferential cylindrical surface of an axial extent to correspond to the length of the lower dwell 44 of the cam 35. When one of the lands 90 cooperates with the O-ring 92 of the dashpot cylinder 86 to cut off flow from one side of the dashpot piston to the other, retarded flow occurs through a previously described bypass to keep each of the successive valves open for a desired time interval.

If less than the six valves is required for a particular installation, the outlet port of the idle valves that are not needed may be closed off. In that event the remaining valves will be opened in sequence with no flow occurring when the V-shaped recess of the cam reaches the idle valves that are not needed in the sprinkler system. If desired, enlargements 76 of the longitudinal rod 75 or lands 90 of the dashpot cylinder 88 that correspond to the idle valves may be omitted. Thus if only four of the radial pipes 28 is to be used in a given installation, two of the outlet ports of the valves may be sealed off and the corresponding two enlargements 76 of the rod 75 or the corresponding two lands 90 of the dashpot cylinder 88 may be omitted. With such omission the operating cycle will be carried out quickly because the cam 35 will not slow down for the idle valves that are not used in the sprinkler system.

My description in specific detail of the presently preferred embodiment of the invention will suggest various changes, substitutions and other departures from my disclosure within the spirit and scope of the appended claims.

I claim:

1. In a device of the character described to control the movement of a series of members between normal first positions and alternate second positions, the combination of:

means to bias said members for movement from their normal first positions to their second positions;

cam means having an upper dwell to hold said members in their normal first positions in opposition to said biasing means;

said cam means having a lower dwell to permit said members to move to their second positions in sequence;

a fluid motor to operate said cam to carry out a cycle for reciprocation of said members in sequence;

and dashpot means to cause said motor to pause when each of said members in turn is controlled by the lower dwell of the cam.

2. In an apparatus of the character described to actuate a series of valves in sequence to distribute water from a pressurized supply to a corresponding series of conduits, the combination of:

cyclic control means movable through a given range to actuate each of said valves in turn;

a hydraulic motor actuated by the pressurized supply, said motor being connected to said cyclic control means for actuation thereof;

means to control energization of the hydraulic motor by the pressurized supply; and means to retard said hydraulic motor at a series of spaced points corresponding to the points at which the cyclic means operates said valves respectively.

3. A combination as set forth in claim 2 in which said hydraulic motor comprises a cylinder with a piston therein connected to the cyclic control means.

4. A combination as set forth in claim 3 in which the retarding means includes:

a second cylinder containing a hydraulic fluid;

a second piston in the second cylinder operatively connected to the first piston; and dashpot means to control the movement of the second piston.

5. A combination as set forth in claim 4 in which the hydraulic fluid in the second cylinder is a liquid other than water.

6. A combination as set forth in claim 2 in which said cyclic control includes a cam operated by the hydraulic motor;

in which said valves are biased to open position by the pressure of the water supply;

in which said cam normally holds said valves in closed position; and in which said cam has a recess which permits the valves to open in sequence at the points at which the hydraulic motor is retarded.

7. A combination as set forth in claim 6 in which said cam is a rotary cam and which includes a rack and gear means for rotation of the cam by the hydraulic motor.

8. A combination as set forth in claim 2, in which each of said valves comprises a valve member movable by the pressure of the supply water from a closed position to an open position; and in which the cyclic control means includes a cam to block movement of the valve members from their closed positions, said cam being movable through a given range and being recessed to permit opening of the valve members in sequence in response to movement of the cam through said range.

9. A combination as set forth in claim 2 in which said retarding means is a dashpot means comprising:

a cylinder containing a body of fluid;

a piston in said cylinder;

a series of means in the cylinder corresponding to the series of valves to restrict flow in the cylinder from one side of said piston to the other side at spaced points in the range of movement of the piston, said spaced points corresponding to the points in the movement of the hydraulic motor at which the cyclic control means operates said valves respectively; and a bypass to permit flow of fluid from one side of said piston to the other at a retarded rate to determine the duration of the time periods during which the successive valves are open.

10. A combination as set forth in claim 9 which includes means to vary the rate of flow through the bypass thereby to vary the duration of the time intervals during which the successive valves are open.

11. A combination as set forth in claim 9 in which said series of restricting means comprises spaced enlargements on a longitudinal rod, said dashpot piston being apertured to traverse the rod.

12. A combination as set forth in claim 9 in which said series of restricting means comprises a series of spaced inner circumferential lands in the dashpot cylinder.

13. A combination as set forth in claim 2 which includes an inlet chamber for the pressurized water and in which said valves are arranged in a circle in communication with said inlet chamber, said valves having piston-type valve members exposed to the water pressure in said inlet chamber for movement of the valve members by water pressure to open positions; and in which said cyclic control means includes a circular cam that normally blocks movement of the valve members out of their closed positions, said cam having a recess therein to permit the valves to open in sequence when the cam is rotated.

14. A combination as set forth in claim 13 in which said recess is of a given dimension circumferentially of the cam;

in which all of the valves except the first and last valve of the series are spaced apart by less than the given dimension of the recess to cause overlap in the operation of the valves; and in which the spacing between the first and last valves of the series is greater than the width of said recess to cause the two valves to be closed when they straddle the recess.

References Cited

UNITED STATES PATENTS

| | | | |
|---|---|---|---|
| 2,420,588 | 5/1947 | Dunnihoo | 137—627 XR |
| 2,420,589 | 5/1947 | Dunnihoo | 137—627 XR |
| 3,056,573 | 10/1962 | Matheson et al. | 251—250 XR |
| 3,152,615 | 10/1964 | Olson | 137—627 |
| 3,195,418 | 7/1965 | Zukas | 251—250 XR |
| 3,338,140 | 8/1967 | Sheesley | 251—250 XR |

DONALD E. WATKINS, *Primary Examiner.*

U.S. Cl. X.R.

137—627, 624.2